United States Patent
Seitsinger et al.

(10) Patent No.: US 6,718,682 B1
(45) Date of Patent: Apr. 13, 2004

(54) PORTABLE FISHING ROD HOLDER

(76) Inventors: Rick W. Seitsinger, 2121 N. 55th W. Ave., Skiatook, OK (US) 74070; Stacey D. Seitsinger, 2121 N. 55th W. Ave., Skiatook, OK (US) 74070

( * ) Notice: Subject to any disclaimer, the term of this patent is extended or adjusted under 35 U.S.C. 154(b) by 0 days.

(21) Appl. No.: 09/928,569

(22) Filed: Aug. 13, 2001

(51) Int. Cl.$^7$ .............................................. A01K 97/10
(52) U.S. Cl. ...................... 43/21.2; 248/513; 248/534; 248/538
(58) Field of Search ....................... 43/21.2; 248/512, 248/513, 518, 534, 535, 538; 211/70.8

(56) References Cited

U.S. PATENT DOCUMENTS

| | | | | |
|---|---|---|---|---|
| 358,307 A | * | 2/1887 | Vermilye | 248/538 |
| 1,192,112 A | * | 7/1916 | Porter | 43/21.2 |
| 1,876,478 A | * | 9/1932 | Van Duzer | 43/21.2 |
| 2,491,008 A | * | 12/1949 | Lake | 43/21.2 |
| 2,773,603 A | * | 12/1956 | Gronek | 248/513 |
| 2,888,220 A | * | 5/1959 | Rose | 248/538 |
| 3,017,149 A | * | 1/1962 | Bossert | 248/513 |
| 3,162,970 A | * | 12/1964 | Gould | 43/21.2 |
| 3,184,192 A | * | 5/1965 | Hoerr | 248/538 |
| 3,571,964 A | * | 3/1971 | Bogathy | 43/21.2 |
| 3,659,369 A | * | 5/1972 | Hermanson | 43/21.2 |
| 3,667,708 A | * | 6/1972 | Smeltzer | 43/21.2 |
| 3,669,390 A | * | 6/1972 | Nielson | 43/21.2 |
| 3,704,000 A | * | 11/1972 | Nelson et al. | 248/538 |
| 4,106,811 A | * | 8/1978 | Hernandez | 43/21.2 |
| 4,245,419 A | * | 1/1981 | McManus | 43/21.2 |
| 4,366,640 A | * | 1/1983 | Clapp | 43/21.2 |
| D271,610 S | | 11/1983 | Lummis | |
| 4,674,222 A | * | 6/1987 | Hughes | 43/21.2 |
| 5,054,738 A | * | 10/1991 | Harding | 43/21.2 |
| 5,295,321 A | * | 3/1994 | Matura | 43/21.2 |
| 5,312,077 A | | 5/1994 | Gutierrez | |
| 5,335,440 A | * | 8/1994 | Williams | 43/21.2 |
| D352,089 S | * | 11/1994 | Barber et al. | D22/147 |
| 5,491,923 A | * | 2/1996 | Zingrone | 43/21.2 |
| 5,557,877 A | | 9/1996 | Colson | |
| 5,813,163 A | | 9/1998 | Dysarz | |
| 5,903,998 A | | 5/1999 | Hawkins et al. | |
| 5,941,015 A | | 8/1999 | Jenkins | |
| 5,987,803 A | | 11/1999 | White | |
| 5,987,804 A | * | 11/1999 | Shearer et al. | 43/21.2 |
| 6,003,748 A | | 12/1999 | Rivenbark | |
| 6,253,484 B1 | * | 7/2001 | O'Connor | 43/21.2 |

FOREIGN PATENT DOCUMENTS

| | | | | |
|---|---|---|---|---|
| CA | 661661 B1 | * | 4/1963 | |
| FR | 2363282 B1 | * | 5/1978 | 43/21.2 |
| GB | 2097231 B1 | * | 11/1982 | |
| GB | 2269518 B1 | * | 2/1994 | |
| JP | 2000-139313 B1 | * | 5/2000 | |
| JP | 2001-211801 B1 | * | 8/2001 | |

\* cited by examiner

*Primary Examiner*—Darren W. Ark
(74) *Attorney, Agent, or Firm*—Fellers, Snider, Blankenship, Bailey & Tippens, P.C.

(57) ABSTRACT

A fishing rod holder having one or more rod stations attached to a support bar. Each rod station includes a loop terminating in a pair of legs received in a pair of apertures in the support bar. In a preferred embodiment, the rod holder provides a plurality of rod stations to improve a fisherman's chances of catching a fish. In another preferred embodiment, the rod holder is configured with a pair of clamps receivable over the rim of a bucket allowing the rod holder to be used virtually anywhere. The bucket may be filled with water to provide storage for live bait.

4 Claims, 7 Drawing Sheets

PORTABLE FISHING ROD HOLDER

BACKGROUND OF THE INVENTION

1. Field of the Invention

This invention relates generally to a holder for a fishing rod. More particularly, but not by way of limitation, the present invention relates to a holder for a fishing rod which may be temporarily supported from another object.

2. Background

Fishing rod holders are well known in the art. Generally speaking, rod holders potentially solve two problems: (a) they free the fisherman to do other things while maintaining one or more lines in the water; and (b) they allow the fisherman to have several lines in the water at one time, thereby increasing the chances of catching a fish.

It is generally accepted that simultaneously fishing with multiple lines in the water dramatically increases the chances of catching a fish. Beyond the obvious advantage of merely increasing the odds of a strike, each hook may be placed at a different depth, different baits may be used, or other factors may be varied to determine an effective combination for a particular type of fish at a particular location at that particular time. Rod holders have been developed for a number of environments, allowing a single fisherman to maintain several rods at one time whether fishing from a boat, a dock, the bank, etc.

In addition, rod holders have been developed in a variety of styles to fill various competing needs, i.e. rod holders for temporary installation versus rod holders for permanent installation; rod holders which hold the rod handle versus rod holders which support the rod while the handle rests on the ground or deck; rod holders developed specifically for use on a particular type of boat; rod holders to be supported from an automobile; rod holders for anchoring to the ground, and the like.

A limitation of some rod holders is the ease with which the rod may be removed by a striking fish. For example, many holders use a simple tube, such as a section of PVC pipe, to support the rod handle. If the pipe is too close to horizontal and sufficient line is in the water, the rod may be easily lost to a striking fish. It should be noted that for boat mounted holders, rocking of the boat may cause the angle between the rod and the line to vary significantly which may compound this problem. Rod holders which support the rod, instead of the handle, likewise allow the rod to fall prey to a striking fish. While it may seem obvious that a rod holder should not allow the rod to be removed by a striking fish, a surprising number of prior art devices will release the rod to relatively small forces exerted longitudinally from the tip of the rod.

A further limitation of many prior art rod holders is that such holders only accommodate a single rod. Since a single fisherman can usually manage a large number of rods, a rod holder should provide multiple stations to reduce the number of mounting points for the holders. In addition, many holders which accommodate multiple rods do not hold the rods in a position, relative to each other, which makes logical use of the fishable area. The ability to "fan-out" the rods at angular intervals improves the distance between rod tips and reduces the risk of entanglement between adjacent fishing lines.

Yet another limitation of many prior art rod holders if the complexity of manufacturing the device. Ideally, a rod holder should be relatively simple to manufacture and should employee a minimal number of fasteners which may inadvertently loosen during use or which may be accidentally lost.

Thus, it is an object of the present invention to provide a fishing rod holder which overcomes the problems and alleviates the needs discussed above.

SUMMARY OF THE INVENTION

The present invention provides a fishing rod holder which is easy to manufacture, adaptable to virtually any fishing environment, provides stations for a plurality of fishing rods while making logical use of the fishable area, and which will not allow removal of the rod by a striking fish.

In a preferred embodiment, a plurality of wire loops are attached to a support bar which is secured to a fixed object by means of a clamping device. When a rod is supported by the holder, the rear portion of the handle passes under the wire loop while the central or forward portion of the rod handle rests on a forward portion of the wire loop which is directly supported by the support bar. To remove the fishing rod, the rod must be tipped slightly upward, thus preventing an outward force on the line from dislodging the rod.

In another embodiment, the clamping device comprises a pair of brackets which are receivable over the edge of a bucket, such as, by way of example and not limitation, a five gallon bucket of the type commonly used as a container for paint. The bucket may then be weighted with sand, water, rocks, or the like, to provide a temporary, fixed support for the rod holder. As will be apparent to those skilled in the art, filling the bucket with water is of particular interest since the bucket may also be used for temporary storage of live bait.

In another embodiment, the inventive rod holder includes a clamp configured for clamping the rod holder to a vertical post, such as a post commonly found on boat docks. Thus, each post of a dock may be used to support several fishing rods simultaneously.

In yet another embodiment, the inventive rod holder includes a clamp configured for clamping the rod holder to a horizontal rail such as, for example, the handrail typically found on pontoon boats.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
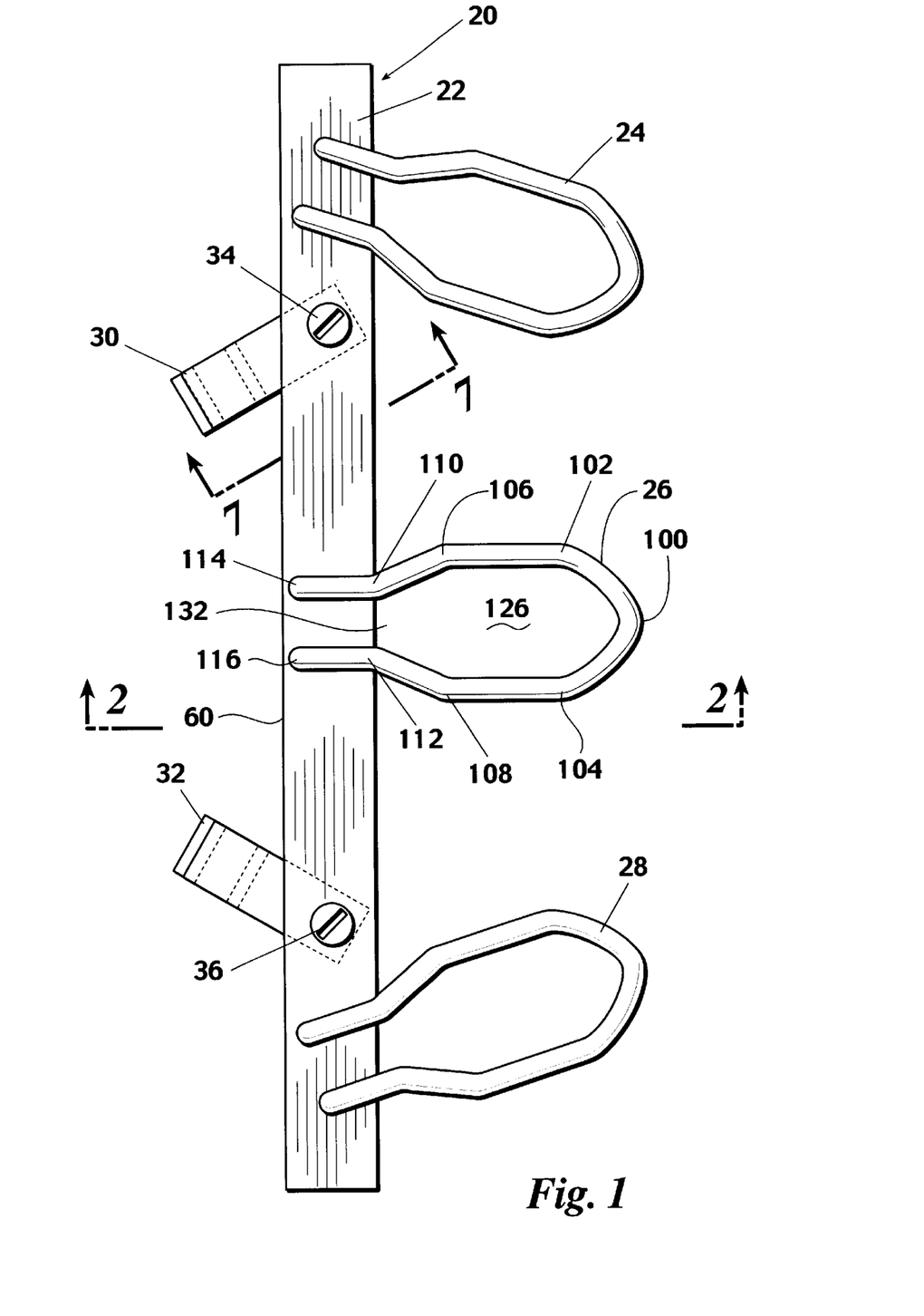
FIG. 1 provides a top plan view of the inventive rod holder adapted for mounting on a bucket.

Referring now to the drawings, wherein like reference numerals indicate the same parts throughout the several views, a preferred embodiment of the inventive fishing rod holder 20 is shown in FIG. 1. Rod holder 20 comprises: a support bar 22; a plurality of loops 24, 26, and 28 (three shown), mounted to bar 22; and a pair of brackets 30 and 32 secured to bar 22 with screws 34 and 36, respectively. Each loop 24–28 provides a rod station along bar 22 to support a fishing rod.

Figure 8:
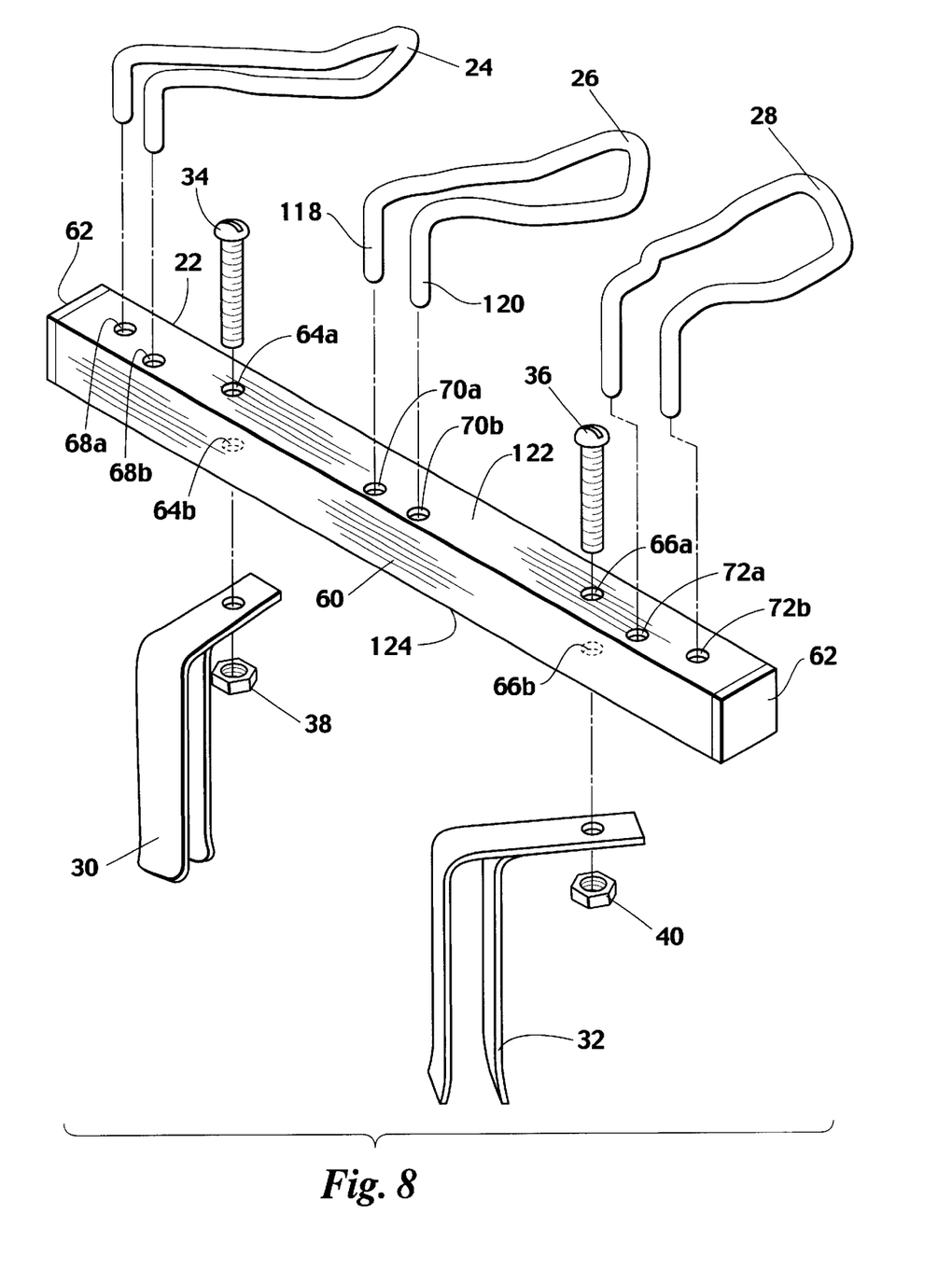
FIG. 8 provides an exploded isometric view of the inventive rod holder.

As best seen in FIG. 8, support bar 22 preferably comprises an elongated section of square tubing 60 having a top wall 122 and a bottom wall 124; a pair of end caps 62; apertures 64a and 64b in top wall 122 and bottom wall 124, respectively, such that apertures 64a and 64b are in alignment to receive screw 34; similarly, apertures 66a and 66b in alignment through top wall 122 and bottom wall 124, respectively, to receive screw 36; apertures 68a and 68b through top wall 122 to receive loop 24; apertures 70a and 70b to receive loop 26; and apertures 72a and 72b to receive loop 28.

Figure 2:
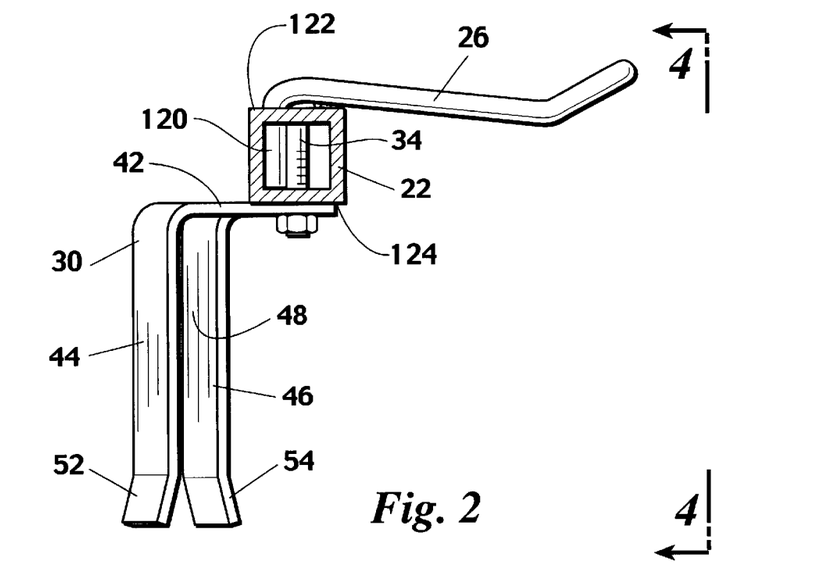
FIG. 2 provides a cutaway side view of the rod holder as seen from perspective 2—2 of FIG. 1.
Figure 3:
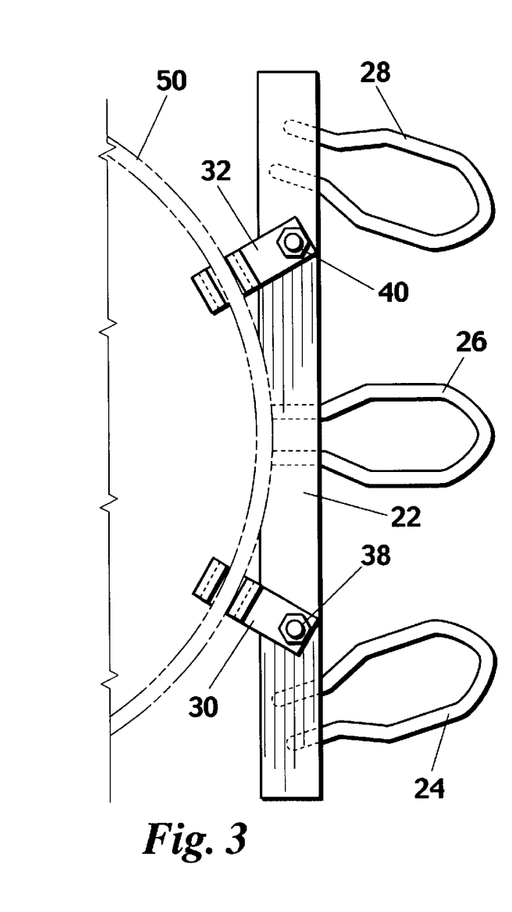
FIG. 3 provides a bottom view of the inventive rod holder installed on a bucket.

Screws 34 and 36 receive nuts 38 and 40, respectively to secure brackets 30 and 32. Preferably, brackets 30 and 32 are identical in construction and, therefore, only bracket 30 will be described in detail, but it is to be understood that bracket 32 includes identical features. Referring next to FIGS. 2 and 3, bracket 30 includes: a mounting surface 42; an outer leg 44 projecting downward from mounting surface 42; and an inner leg 46 likewise projecting downward from surface 42. Gap 48 is formed between legs 44 and 46 for placement over the rim of a bucket 50 (FIG. 3). Preferably, the distal end 52 of outer leg 44 bends slightly outward and the distal end 54 of inner leg 46 bends slightly inward to facilitate slipping bracket 30 over the bucket 50. Mounting surface 42 includes an aperture (not shown) for receiving screw 34. It should be noted, as best seen in FIG. 3, that brackets 30 and 32 swivel at screws 34 and 36, respectively, to allow rod holder 20 to accommodate buckets of varying sizes or shapes. After fitting brackets 30 and 32 to a particular bucket, screws 34 and 36 may be tightened to hold brackets 30 and 32 in place. Alternatively, nuts 38 and 40 may be of a locking style such that brackets screws 34 and 36 do not need to be tightened to the point where brackets 30 and 32 have resistance to movement. As will be apparent to those skilled in the art, it is also possible to provide threaded apertures directly in surface 42 which would eliminate the need for nuts 38 and 40.

Figure 4:
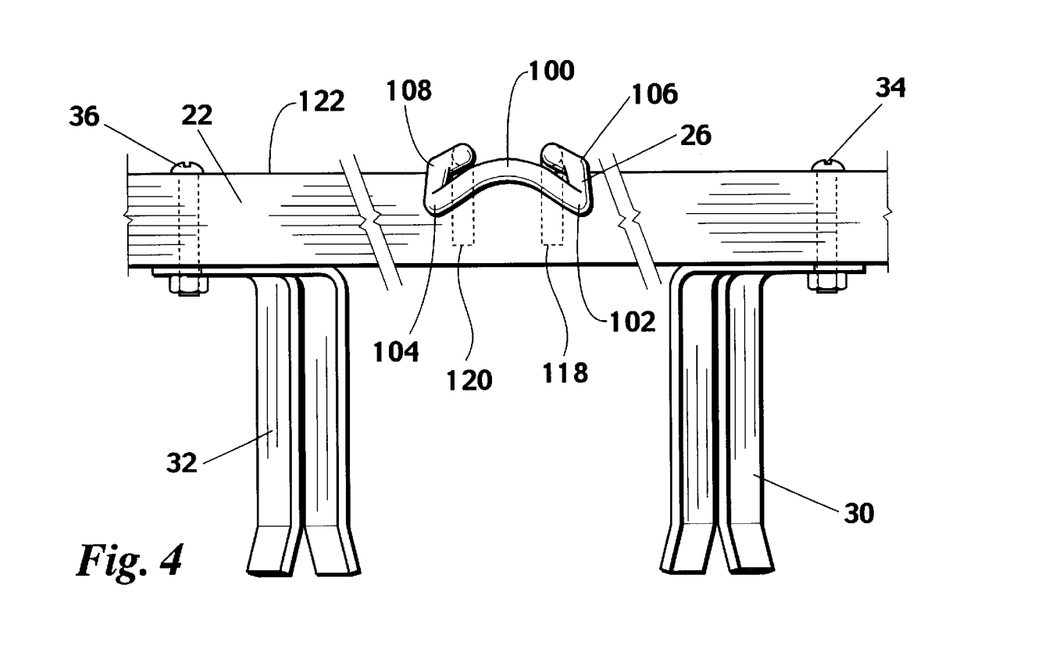
FIG. 4 provides a partial back view of the inventive rod holder as seen from perspective 4—4 of FIG. 2.

Referring again to FIG. 1, with further reference to FIG. 4, preferably, loops 24, 26, and 28 are identical in construction. Accordingly, only the construction of loop 26 will be described in detail, however it is to be understood that the description of the features of loop 26 are likewise applicable to loops 24 and 28. In the preferred embodiment, loop 26 is formed by bending a metal wire. At a first bend 100, approximately at the center of the wire, the rearward portion of the loop is formed such that the wire transitions forward and slightly downward from bend 100. At bends 102 and 104, the wire is bent to extend forward and slightly upward to form a U-shaped portion. At bends 106 and 108, the wire is bent to narrow the U-shaped portion and, at bends 110 and 112, bent to extend forward once again. Finally, at bends 114 and 116, the wire is bent downwards to form vertical legs 118 and 120 which are received in apertures 70a and 70b (FIG. 8) of support bar 22. As will be apparent to those skilled in the art, while in the preferred embodiment, loop 26 is formed by bending metal wire, a number of alternative materials and methods could be employed instead. By way of example and not limitation, loop 26 could be: formed from plastic material by known molding techniques such as injection molding; formed from tubing rather than solid wire; formed by forging or casting suitable metal materials; etc.

Figure 5:
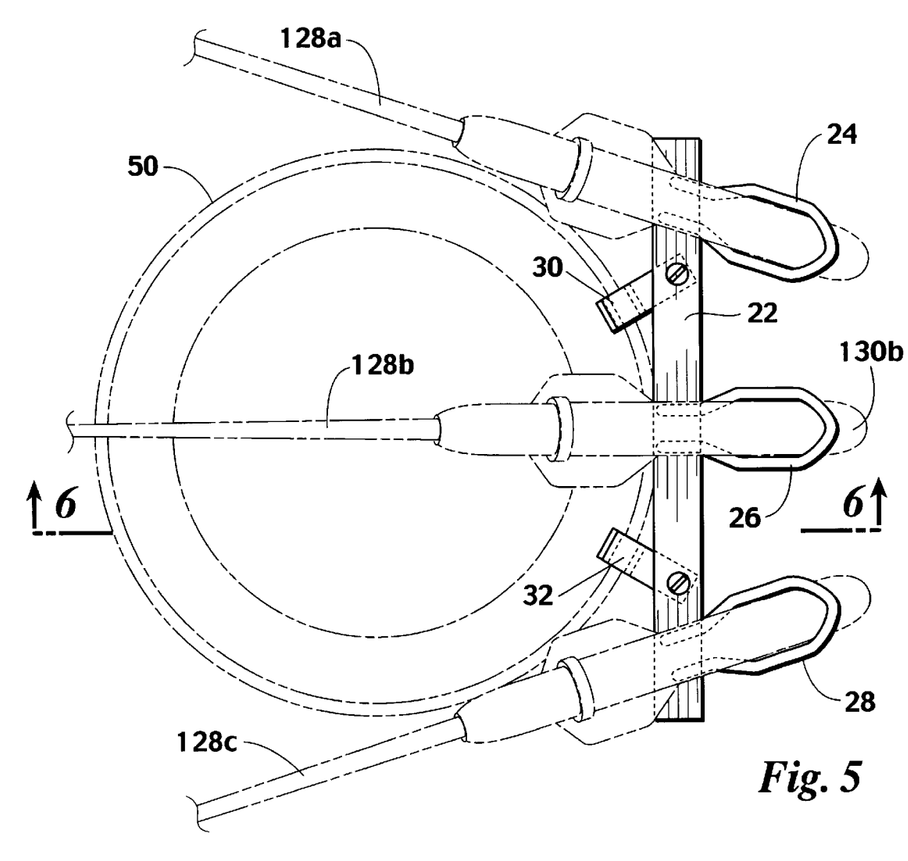
FIG. 5 provides a top view of the inventive rod holder installed on a bucket.

It should be noted that the position of the aperture pairs 68a–b, 70a–b, and 72a–b (FIG. 8) determines the angle of each fishing rod 128a, 128b, or 128c (as seen in FIG. 5), relative to the rod holder 20 and the other fishing rods 128a–c. It should also be noted that if, in forming the loops 24–28, the spacing between legs 118 and 120 is made slightly larger than the spacing between the apertures of a pair 68a–b, 70a–b, or 72a–b, and loops 24–28 are formed from a somewhat resilient material, then the loops 24–28 must be temporarily squeezed to insert legs 118 and 120 in their respective apertures and, after insertion, will spring back outwards to secure the loops 24–28 to support bar 22. Alternatively, loops 24–28 may be secured to bar 22 by welding or with an adhesive. When a loop, such as loop 26, is attached to support bar 22, an opening 126 is formed through the inside of loop 26.

Figures 6, 7:
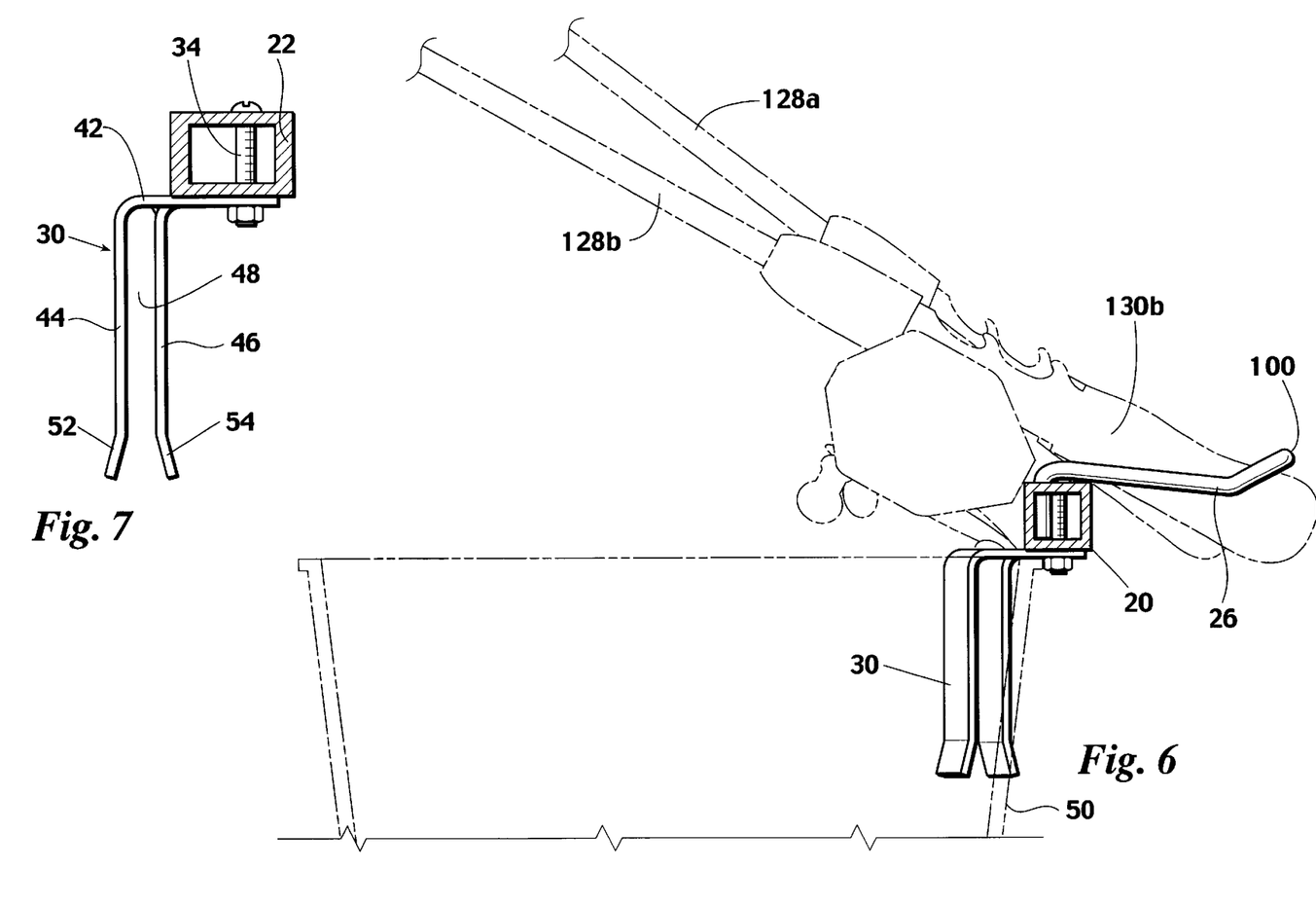
FIG. 6 provides a side cutaway view of the rod holder shown from perspective 6—6 of FIG. 5.
FIG. 7 provides a cutaway view of the rod holder as seen from perspective 7—7 of FIG. 1.

Referring next to FIGS. 5 and 6, typically clamps 30 and 32 of rod holder 20 are first placed over the outer rim of bucket 50. To insert fishing rod 128b, for example, the bottom end of rod handle 130b is first placed through opening 126 (FIG. 1) of loop 26 then the rod is allowed to tip forward with the forward portion of handle 130b resting on the narrowed portion 132 (FIG. 1) of loop 26. It should be noted that outward longitudinal forces applied to the rod (as when a fish bites) will tend to pull handle 130b into the wedge formed by the narrowed portion 132 of loop 26 and movement of the rearward portion of handle 130b will resisted by loop 26 at bend 100 (FIG. 1). Thus, rod holder 20 resists dislodging of the fishing rod absent at least a slight upward tipping of the fishing rod. When a fish is caught, the fisherman can grasp the rod 128b at the fishing reel and easily remove the rod from loop 26 by simply tipping the rod tip slightly upward for reeling the fish in.

Figure 12:
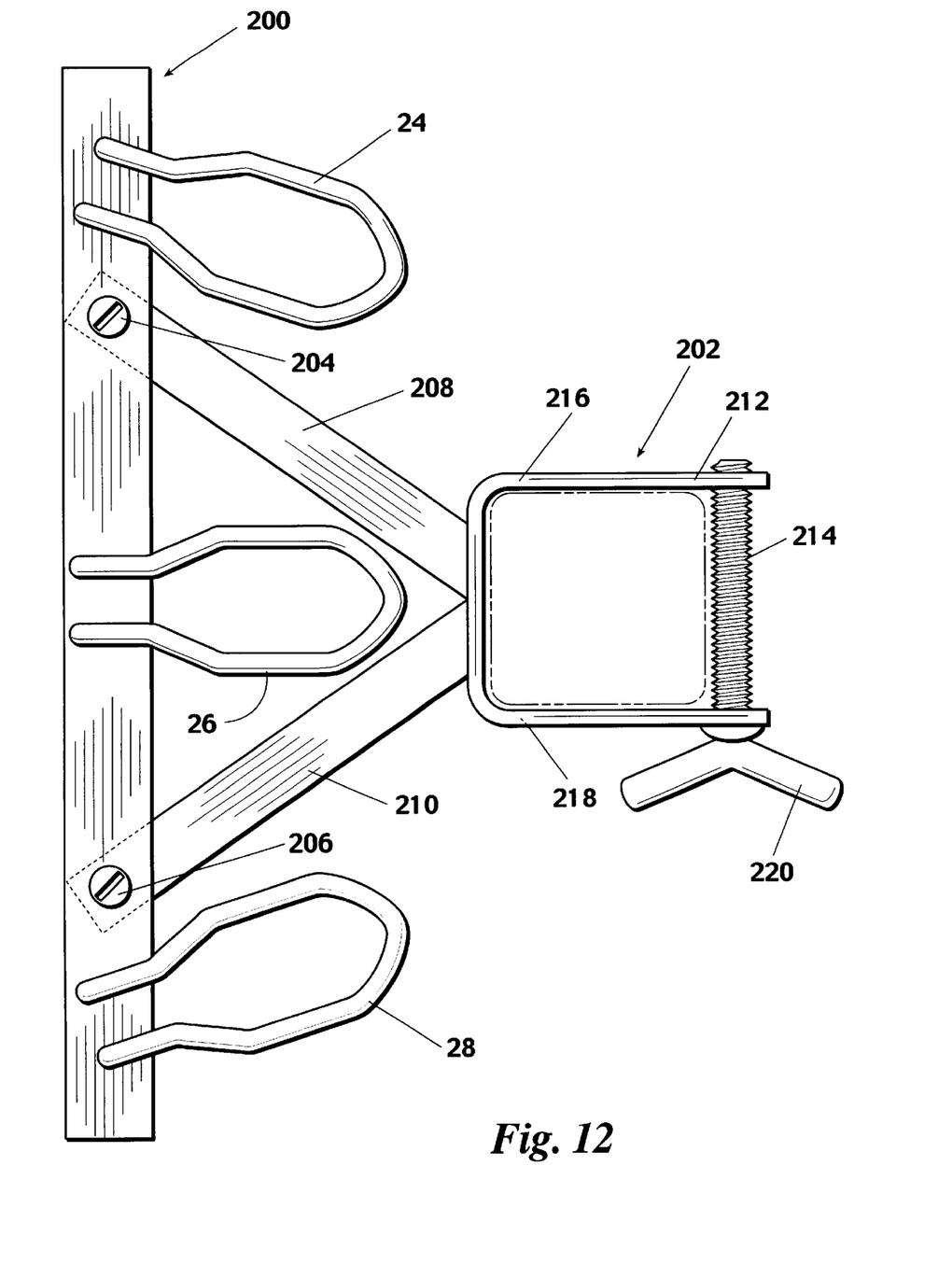
FIG. 12 provides a top view of the inventive rod holder having a bracket for clamping to a vertical square post.

In another preferred embodiment, as shown in FIG. 12, the inventive rod holder 200 is configured for clamping to a vertical post, such as the posts commonly found on boat docks. The structure of support bar 22 and loops 24, 26, and 28 is identical to the previously described embodiment. However, instead of clamps 30 and 32 for securing the device to a bucket, rod holder 200 includes clamp 202 secured to support bar 22 with screws 204 and 206.

Clamp 202 includes: arms 208 and 210 extending from support bar 22; bracket 212 attached to arms 208 and 210; and screw 214 threadedly received in bracket 212 for squeezing sides 216 and 218 of bracket 212 to secure rod holder 200 to a post. Preferably, screw 214 includes a feature such as wing 220 to allow tightening, or loosening, of screw 214 without the use of a tool. As will be apparent to those skilled in the art, a number of such features are well known in the art such as, by way of example and not limitation: knobs, either with or without knurling; T-handles; and the like. It should be noted that, while rod holder 200 is shown having a clamp for square posts, bracket 212 could be formed to accept cylindrical posts, rectangular posts, or, for that matter, posts of virtually any shape.

Figure 9:
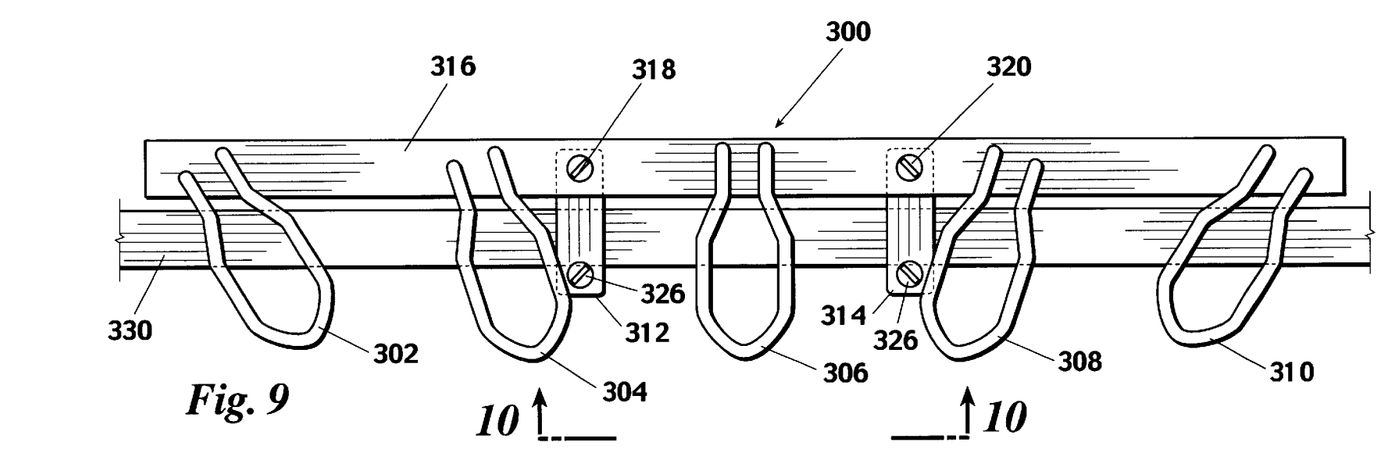
FIG. 9 provides a top view of the inventive rod holder having brackets for clamping to a horizontal rail.
Figure 10:
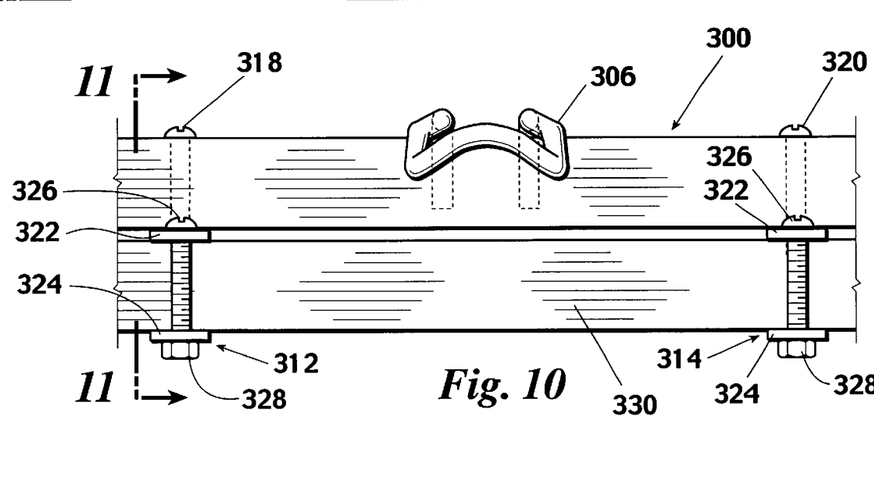
FIG. 10 provides a partial back view of the rod holder shown from perspective 10—10 of FIG. 9.
Figure 11:
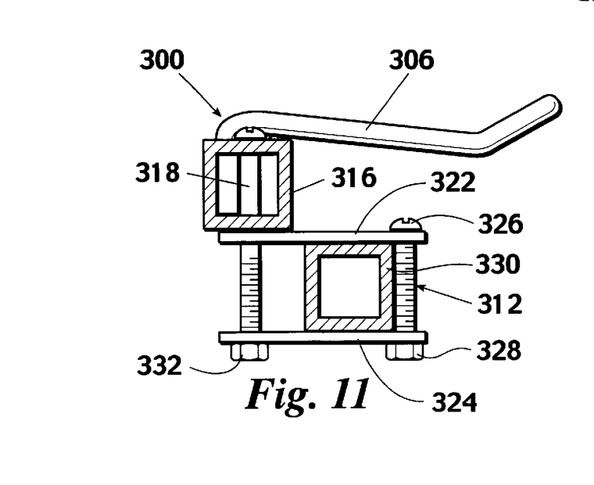
FIG. 11 provides a cutaway side view of the rod holder as seen from perspective 11—11 of FIG. 10.

In yet another preferred embodiment, as shown in FIGS. 9, 10, and 11, the inventive rod holder 300 is configured for five rod stations, rather than three stations, as in the previously described embodiments, thus having five loops 302, 304, 306, 308, 310. In addition, rod holder 300 includes clamps 312 and 314, attached to support bar 316 with screws 318 and 320, respectively, for clamping rod holder 300 to a horizontal rail 330.

Each clamp 312 or 314 includes: an upper arm 322; a lower arm 324; a screw 326 extending through arms 322 and 324; and a nut 328. Typically, clamps 312 and 314 are first secured to support bar 316 with screws 318–320, and nuts 332. The clamps are then placed over a horizontal rail 330, screws 326 are next placed through arms 322 and 324 and secured with nuts 328. Rail 330 is typical of rails found on pontoon boats, as well as many other types of boats. As will be apparent to those skilled in the art, clamps 312 and 314 could easily be formed to accommodate other types or sizes of rails and such modifications are within the spirit of the present invention.

As will also be apparent to those skilled in the art, while the preferred embodiments of the inventive rod holder have been described as providing three or five rod stations, the invention is not so limited. The inventive device may be configured with any number of rod stations. However, it should be noted that, as more stations are added, care should be taken to ensure that either the distance between individual rods is sufficient, or the angular displacement between rod is sufficient to maintain an acceptable distance between individual fishing lines in the water to keep line entanglement to an acceptable level.

In a similar vein, while the support bar has been shown as straight with an angular offset between adjacent loops, the invention is not so limited. By way of example and not limitation, the support bar could instead be curved with the loops placed perpendicular to the bar at each station or a straight bar could be made long enough that the distance between individual stations is sufficient to make good use of the fishable area. Such modifications are within the scope and spirit of the present invention.

Finally, it should also be noted that the inventive device is equally well suited for use on a boat, a dock, the shore or bank, or virtually any other area on or around a body of water.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A fishing rod holder for use on a bucket having a rim, comprising:

a support bar having a plurality of rod stations, said support bar includes a plurality of pairs of apertures and each rod station of said plurality of rod stations comprises a loop, said loop terminating in a pair of vertical legs received in one pair of apertures of said plurality of pairs of apertures; and a pair of clamps attached to, and extending downwardly from, said support bar, each clamp of said pair of clamps having a first leg and a second leg such that a gap is formed between said first leg and said second leg, said gap receivable over the rim of the bucket to support said plurality of rod stations above the bucket.

2. A fishing rod holder for a fishing rod of the type having a handle at a rearward end of the fishing rod, comprising:

a support bar having a plurality of pairs of apertures therein;

a plurality of rod stations attached to said support bar, each rod station of said plurality of rod stations comprising a loop terminating in a pair of vertical legs received in one pair of apertures of said plurality of pairs of apertures such that said loop projects in a substantially rearward direction from said support bar to receive the fishing rod handle through the loop such that a rearward portion of the handle is supported by said loop and a forward portion of the handle is supported by said each rod station proximate said support bar; and a clamp attached to said support bar, said clamp is configured to be secured to a bucket having a rim, said clamp comprising a pair of brackets, each of said brackets comprising an inner leg and an outer leg such that a gap is formed between said inner and outer legs, said gap receivable over the rim of the bucket.

3. The fishing rod holder of claim 2 wherein said loop is formed by bending wire.

4. The fishing rod holder of claim 2 wherein said loop projects from said support bar in a substantially horizontal orientation.

* * * * *